United States Patent [19]

Frazee

[11] 4,121,141

[45] Oct. 17, 1978

[54] D.C. MOTOR SPEED CONTROL CIRCUITRY

[75] Inventor: Jerome A. Frazee, Milpitas, Calif.

[73] Assignee: Fairchild Camera and Instrument Corporation, Mountain View, Calif.

[21] Appl. No.: 796,587

[22] Filed: May 13, 1977

[51] Int. Cl.² .............................................. H02P 5/16
[52] U.S. Cl. ..................................... 318/326; 318/341
[58] Field of Search ............... 318/326, 327, 328, 341, 318/318, 314

[56] References Cited

U.S. PATENT DOCUMENTS 3,358,206  12/1967  Thiele .................................. 318/341
3,409,814  11/1968  Azuma et al. ........................ 318/341
4,034,274  7/1977  Akima .................................. 318/341

Primary Examiner—David Smith, Jr.
Attorney, Agent, or Firm—Alan H. MacPherson; Robert C. Colwell

[57] ABSTRACT

A closed loop D.C. motor speed control circuit compares tachometer feed-back signals proportional to the D.C. motor speed with a voltage reference representing the desired motor speed and generates pulses for controlling a variable duty cycle switch in the motor circuit for maintaining a constant speed irrespective of line voltage variations and load changes.

6 Claims, 2 Drawing Figures

D.C. MOTOR SPEED CONTROL CIRCUITRY

This invention relates to D.C. motor speed control circuitry and particularly to a novel and improved circuit that receives motor speed related tachometer signals which, after being converted into pulses and compared with reference voltages, control a variable duty cycle switch in the motor power circuit for accurately controlling the speed thereof.

SUMMARY OF THE INVENTION

Typically, rotational speed control of small D.C. motors, such as those used as capstan drivers for tape players, amateur movie cameras, phonographs, etc., has been either by the control of negative impedance regulation or by linear voltage regulation of a tachometer feedback signal. In such a control system, a tachometer produces a speed proportional D.C. feedback signal which is compared with the D.C. reference voltage representing the desired motor speed. The difference or error signal is then amplified and applied to a current control transistor in series with the motor power circuit. The series transistor thus introduces a series impedance and a consequent loss of unuseable power, lowered system efficiency, and a faster depletion of batteries.

The motor control circuit of this invention also receives the motor speed related tachometer A.C. signals and compares them with a reference voltage representing the desired motor speed. However, the resulting difference or error signal controls a duty cycle switch that accurately controls the motor speed without the introduction of impedances and the resulting efficiency losses.

Briefly described, the circuitry of the invention receives an A.C. tachometer signal that is proportional to motor speed. This signal is applied to a hysteresis switch that produces a square wave output of constant amplitude and at the frequency of the tachometer signal. A portion of each pulse is integrated and compared with a reference voltage representing the desired motor speed, and the resulting comparator signal controls the duty cycle of a high current output switching transistor in series with the motor output circuit.

DESCRIPTION OF THE DRAWINGS

In the drawings which illustrate a preferred embodiment of the invention.

DETAILED DESCRIPTION OF THE PREFERRED EMBODIMENT

Figure 1:
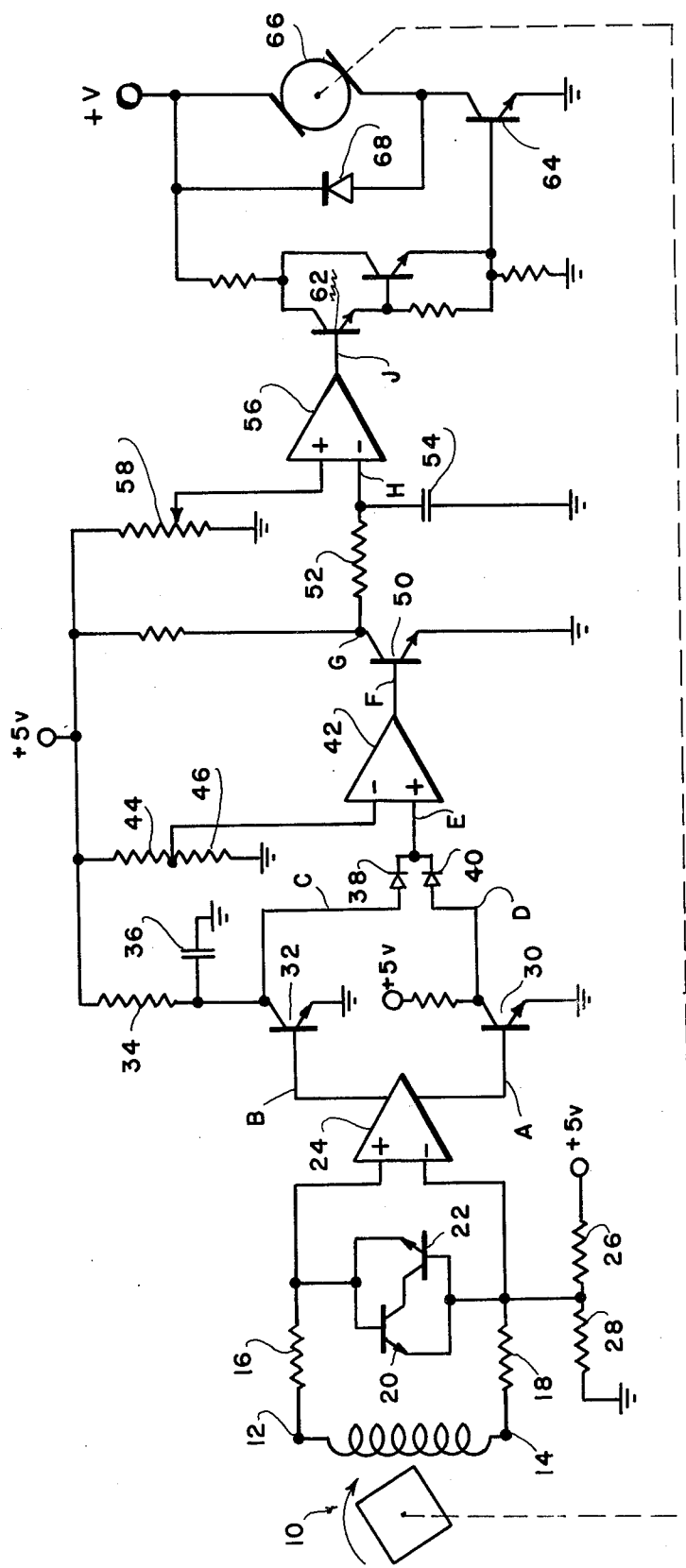
FIG. 1 is a schematic diagram of the circuitry of the invention.

As illustrated in the schematic diagram of FIG. 1, an input signal that may be generated by a motor-driven tachometer 10 generates an A.C. signal that is applied to the input terminals 12 and 14 of the control circuitry. Tachometer 10 is illustrated as a mechanically coupled device that magnetically generates A.C. signals, the frequency of which is proportional to the speed of the motor that is being controlled by the circuitry of the invention. It is clear, however, that other types of tachometer signals may be introduced to the circuit, such as those generated by optical means, by Hall cells, etc. The frequency of the tachometer input signals is not critical; however, slow tachometer frequency resulting from too few pulses per revolution of the motor will produce perturbations and motor cogging. It is therefore preferable that the tachometer produce a frequency in the order of 400 Hz, or more, to provide a fine resolution.

The output voltage produced by tachometer 10 should be at least 0.1 volts, peak-to-peak, and may be as high as 12 to 15 volts since the input voltage is first applied to a limiter circuit comprising resistors 16 and 18 and the diode connected transistors 20 and 22. The resistor 16 is coupled between input terminal 12 and the non-inverting input of an operational amplifier connected as a hysteresis switch 24 and the resistor 18 is coupled between the input terminal 14 and the inverting terminal of the switch 24. The diode connected transistors 20 and 22 are coupled directly across the input terminals of the switch 24, and the inverting input terminal of switch 24 is biased at a 2.5 volts level by connecting it to a point mid-way between identical resistors 26 and 28 that are coupled between a regulated 5-volt D.C. source and ground. Thus, the switch 24 operates to square the tachometer input signal and also provides a small hysteresis centered around the bias level applied to the inverting input of the switch 24. This hysteresis ensures positive switching in the presence of noise that may be introduced into the circuitry.

Figure 2:
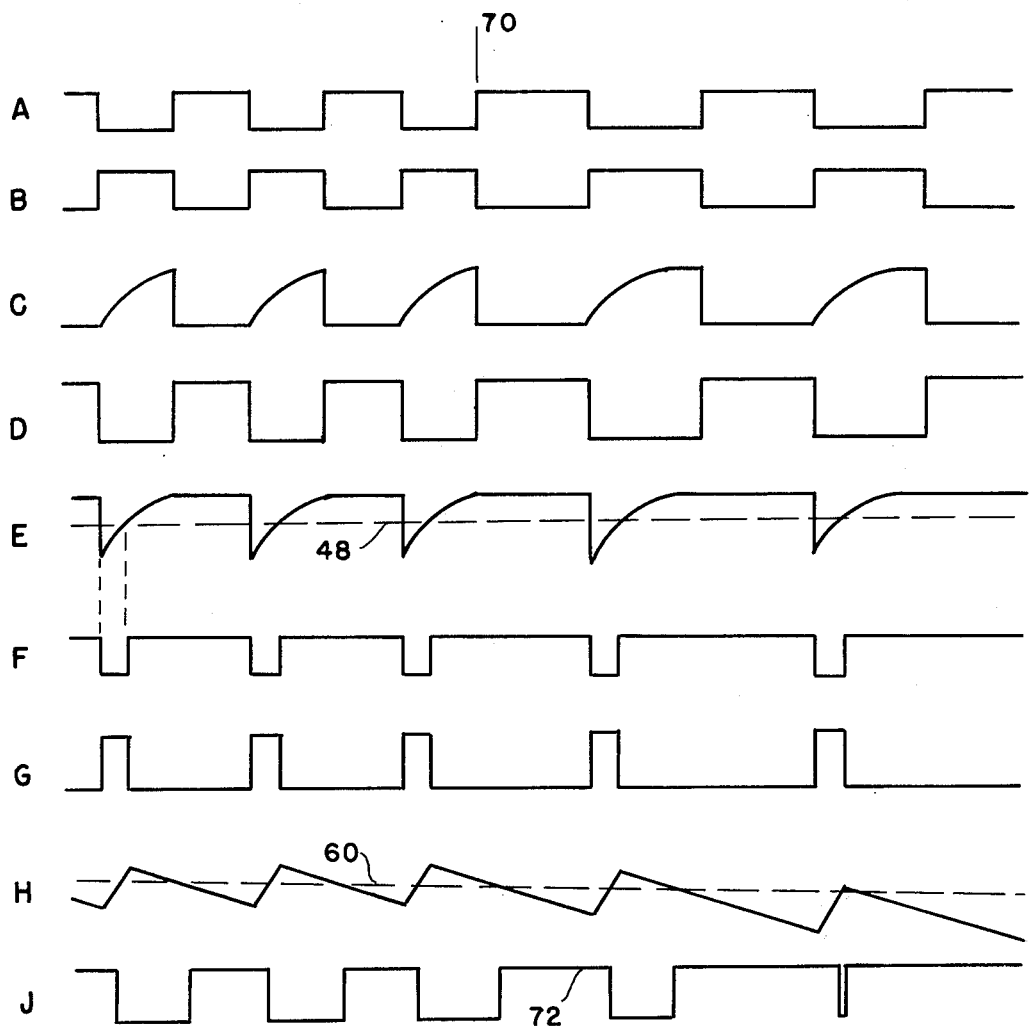
FIG. 2 is a waveform diagram illustrating the various waveforms present at various points in the circuit diagram of FIG. 1.

Switch 24 generates a pair of complementary square wave output signals as indicated by the waveforms A and B of FIG. 2. These output signals are at a constant amplitude determined by the supply voltage applied to the switch 24 and are at the frequency of the A.C. signals produced by the tachometer 10. The output signal, A, is applied to the base of an NPN transistor 30 and the output signal, B, is applied to the base of an identical transistor 32. The emitters of transistors 30 and 32 are connected to ground and the collector of transistors 30 is coupled through a suitable load resistor to a regulated D.C. voltage source. The collector of transistor 32 is connected through a resistor 34 to a regulated 5-volt source and is also connected to one terminal of a capacitor 36, the other terminal of which is grounded. The capacitor 36 and resistor 34 form an R.C. time constant circuit and, during the period that the signal, B, is low and transistor 32 is non-conductive, produces at the collector of transistor 32 the integrated signal, C, as illustrated in FIG. 2.

The integrated signal C and the square wave signal D are ORed together through diodes 38 and 40, respectively, to form the waveform, E, as shown in FIG. 2. This signal is applied to the non-inverting input terminal of an operational amplifier 42. The inverting input of amplifier 42 is connected to the mid-point of identical resistors 44 and 46 which are coupled between the regulated 5-volt source and ground. Thus, a threshold voltage of 2.5 volts, as indicated by the reference numeral 48 in the waveform E of FIG. 2, is applied to the inverting terminal of the amplifier 42 to produce an output signal, F, that is at a high level only during the periods that the input signal, E, exceeds the threshold voltage applied to the inverting input terminal.

It will be noted from an inspection of the waveform F of FIG. 2 that the length or period of each high level pulse in the pulse train will vary according to the input frequency applied by the tachometer 10. However, since the RC time constant provided by the resistor 34 and the capacitor 36 remains constant and is in a voltage-regulated circuit, the negative portions or separations between the high levels of the waveform F are always a constant length. The signal, F, is applied to the base of a transistor 50, the emitter of which is grounded and the collector of which is connected through a suitable load resistor to the regulated 5-volt source. The signal F is therefore inverted and is shown as signal G in FIG. 2 as a train of pulses of equal and constant area but separated according to the input frequency to the circuit. The circuitry between the input terminals and the collector of the transistor 50 may be considered a frequency to voltage converter.

The collector of transistor 50 is connected through an integrating circuit comprising a resistor 52 and capacitor 54 to the inverting terminal of an operational amplifier 56. As shown in FIG. 2, the integrator circuit receives the signal, G, at the collector of transistor 50 and produces the integrated signal, H, that is applied to the amplifier 56. The non-inverting input terminal of amplifier 56 is coupled to the adjustable arm of a potentiometer 58, the ends of which are coupled between the regulated 5-volt source and ground. Potentiometer 58 serves as a motor speed adjustment and applies a threshold level, indicated by the reference numeral 60 in the waveform H of FIG. 2, to the amplifier 56. Amplifier 56 is therefore a signal comparator and produces an output signal J, that is high when the integrated input signal H exceeds the threshold voltage 60, as shown in FIG. 2.

The output signal, J, from the comparator amplifier 56 is applied to the input of a darlington driver 62, the output of which is applied to the base of a common emitter high current switching transistor 64. The emitter of transistor 64 is grounded and the collector is connected to one input terminal of the D.C. motor 66, the opposite terminal of which is coupled to a D.C. voltage source which may typically be in the range of 10 to 16 volts. The collector of transistor 64 is also connected to the anode of a power diode 68, the cathode of which is connected to the voltage source. The diode 68 is a flyback diode that shorts out transient currents generated by the motor inductance when the switching transistor 64 is switched off and which may produce peak currents as high as 2 amperes through the diode 68.

OPERATION

At the instant power is first applied to the motor circuit, the motor 66 is stationary and no signals are introduced from tachometer 10 to the input terminals 12 and 14 of the circuit. Therefore, a signal, G, at the collector of transistor 50 remains low and the comparator 56 produces a constant high level output signal, J, that turns on the power switch 64 to apply maximum starting current to the motor 66. The motor 66 thus starts turning and, when the tachometer signal is of sufficient amplitude to switch the amplifier 24, the integrator capacitor 54 starts to charge for a constant period determined by its input waveform G and to discharge for a period determined by the tachometer frequency. As motor 66 accelerates, the discharge period of capacitor 54 becomes shorter until the average voltage on the capacitor 54 equals the reference threshold voltage 60 that is applied by the potentiometer 58 and illustrated in waveform H of FIG. 2. This results in approximately a 50% duty cycle rectangular current drive to the output transistor 64 to control the rotational speed of motor 66 and thus closing the feedback loop and completing the motor speed regulation system.

If the load on motor 66 is suddenly increased, such as indicated by the reference numeral 70 in waveform A of FIG. 2, there will be a proportional decrease in the input frequency generated by the tachometer 10 and a consequent lengthening of the switching period of the waveforms A and B. This lengthens the period of the constant area waveforms G so that the discharge time of the integrator capacitor 54 is similarly lengthened as shown in the waveform, H. Thus, the output pulse, J, that controls the motor switching transistor 64 is lengthened, as indicated by the reference numeral 72. As the slowing of motor 66 continues, the transistor 64 remains on for longer periods to apply higher currents to the motor 66 to overcome the slowing tendency. Thus, a steady state condition is reached when the duty cycle of the output transistor 64 is matched with the torque required of the motor 66.

Having thus described my invention, what is claimed is:

1. Circuitry for controlling the speed of a D.C. motor having means for generating an A.C. output signal proportional to the rotational speed of said motor, said control circuitry comprising:
   first operational amplifier means coupled to receive the A.C. output signal proportional to the rotational speed of said motor and coupled to a first source of reference potential to thereby generate first and a second square wave output signals, said first and said second square wave output signals being complementary to each other, and being at a frequency proportional to the frequency of said A.C. output signal;
   first integrating means coupled to the first operational amplifier means for integrating the second square wave signal;
   OR gate means coupled to the first integrating means and to the first operational amplifier means for combining the first square wave signal with the integrated second square wave signal;
   second operational amplifier means coupled to the OR gate means to receive the output signal therefrom and coupled to a second reference voltage source for producing a third square wave signal;
   second integrating means coupled to receive and integrate the signal from the second operational amplifier means;
   comparison means for comparing the integrated pulses from said integrating means with an adjustable D.C. speed control reference voltage; and
   variable duty cycle switching means in circuit with the D.C. motor, said switching means coupled to the output of said comparison means for conducting current through said motor when said speed control reference voltage exceeds the level of said integrated pulses.

2. The circuitry claimed in claim 1 wherein said variable duty cycle switching means includes a high current switching transistor coupled in series with said D.C. motor.

3. The circuitry claimed in claim 2 wherein said switching transistor is coupled between said D.C. motor and ground reference.

4. The circuitry claimed in claim 2 wherein said variable duty switching means includes a high current flyback diode coupled across the terminals of said D.C. motor, the cathode of said diode being coupled to the positive D.C. terminal of said motor.

5. The circuitry claimed in claim 4 wherein said variable duty cycle switching means includes a darlington coupled transistor pair coupled to receive the output signals from said comparitor means and to drive said switching transistor.

6. Circuitry as claimed in claim 1 further including voltage limiting means coupled across the input terminals of said first operational amplifier means for limiting the amplitude of the A.C. signals applied thereto.

* * * * *